United States Patent [19]
LaBonde

[11] Patent Number: 5,654,687
[45] Date of Patent: Aug. 5, 1997

[54] MOTOR-VEHICLE DOOR-LATCH HANDLE WITH ALARM INTERCONNECT

[75] Inventor: Damien LaBonde, Essen, Germany

[73] Assignee: Kiekert AG, Heiligenhaus, Germany

[21] Appl. No.: 611,020

[22] Filed: Mar. 5, 1996

[30] Foreign Application Priority Data

Mar. 7, 1995 [DE] Germany .......... 195 07 911.6

[51] Int. Cl.$^6$ .................................. B60R 25/10
[52] U.S. Cl. .............. 340/426; 340/425.5; 340/541; 307/10.2; 180/287; 200/61.44
[58] Field of Search .................. 340/426, 425.5, 340/541; 307/10.2; 180/287; 200/61.44

[56] References Cited

U.S. PATENT DOCUMENTS

| 4,024,494 | 5/1977 | Quesnel | 200/61.44 |
| 4,983,947 | 1/1991 | Mullen et al. | 340/426 |

FOREIGN PATENT DOCUMENTS

| 30 30 519 | 2/1982 | Germany . |
| 3030519C2 | 2/1982 | Germany . |
| 3248964C2 | 10/1983 | Germany . |
| 32 48 964 | 10/1983 | Germany . |

*Primary Examiner*—Jeffery Hofsass
*Assistant Examiner*—Sihong Huang
*Attorney, Agent, or Firm*—Herbert Dubno; Andrew Wilford

[57] ABSTRACT

An actuating assembly used in motor vehicle having an alarm system, a door having a panel, and a latch has a handle extending longitudinally outside the panel and having one end coupled to the latch and another end projecting through the panel and provided with a fork having a longitudinally open seat and a backing plate on inside the panel and provided with a transversely extending pivot bar engaged in the seat of the fork. The handle is pivotal about the bar between a rest position relatively close to the door and an outer actuated position pulled out from the door. An electrical conductor imbedded in the handle has a pair of opposite ends exposed longitudinally at the fork. Respective contact elements secured to the door are releasably engaged with the conductor ends. The contact elements and opposite ends are positioned such that on movement of the handle outward beyond its outer actuated position at least one of the contacts is separated from the respective conductor end. Electrical circuitry between the alarm system and the contacts activates the alarm system when one of the contacts is separated from the respective conductor end.

5 Claims, 3 Drawing Sheets

MOTOR-VEHICLE DOOR-LATCH HANDLE WITH ALARM INTERCONNECT

FIELD OF THE INVENTION

The present invention relates to a motor-vehicle door latch. More particularly this invention concerns a handle for such a latch.

BACKGROUND OF THE INVENTION

A typical motor-vehicle door latch is actuated by a handle which as described in German patent 3,030,519 of Keller has two main parts, a backing plate that lies against the inside surface of the outer door panel and a handle which lies outside the outer door panel and that engages at both ends through the panel. At one end the handle is coupled to the motor-vehicle door latch, normally via a locking mechanism that can block or uncouple the handle. At the opposite end the handle is mounted inside the door on a pivot formed by the backing plate.

While such a mechanism is fairly simple it constitutes a particularly easy point of attack for an unauthorized unlocking of the door. A would-be thief need merely pull the handle forcibly outward, typically with a pry bar, so that it can be removed completely from the door, leaving a hole through which access can be gained to the latch and look mechanism. A tool such as a screwdriver can be inserted into the thus created hole to actuate the latch and open the door.

German patent 3,238,964 of Grabner proposes a system wherein the handle is formed with a lobe that interfits with structure of the backing plate so that the two cannot be separated without destroying one or the other. While this arrangement is fairly effective, it is quite complex to manufacture and rather difficult to install in the vehicle.

Neither of these prior-art systems is integrated into an on-board motor-vehicle alarm system. Thus the would-be thief can work away at the latch and will not set the alarm off until he/she actually opens the door.

OBJECTS OF THE INVENTION

It is therefore an object of the present invention to provide an improved handle assembly for a motor-vehicle door latch.

Another object is the provision of such an improved handle assembly for a motor-vehicle door latch which overcomes the above-given disadvantages, that is which is provided with an alarm interconnect so that if the handle is tampered with the alarm is tripped.

SUMMARY OF THE INVENTION

The instant invention is an actuating assembly used in motor vehicle having an alarm system, a door having a panel, and a latch. The actuating assembly according to the invention has a handle extending longitudinally on an outside of the panel and having one end coupled to the latch and another end projecting through the panel and provided with a fork having a longitudinally open seat and a backing plate on an inside of the panel and provided with a transversely extending pivot bar engaged in the seat of the fork. The handle is pivotal about the bar between a rest position relatively close to the door and an outer actuated position pulled out from the door. An electrical conductor imbedded in the handle has a pair of opposite ends exposed longitudinally at the fork. Respective contact elements secured to the door are releasably engaged with the conductor ends. The contact elements and opposite ends are positioned such that on movement of the handle outward beyond its outer actuated position at least one of the contacts is separated from the respective conductor end. Electrical circuitry between the alarm system and the contacts activates the alarm system when one of the contacts is separated from the respective conductor end.

Thus if a would-be thief will trip the alarm as soon as he/she pries the door handle out past the normal outer actuated position. Before there is time to work on the latch, the alarm will go off, probably scaring off the miscreant. The alarm can operate a siren, flash the vehicle lights, send out a radio signal to warn the vehicle owner, start a video recorder, or otherwise operate to deter or trap the person breaking the handle.

According to the invention the ends are formed as sockets and the contact elements are a plug fitting into the sockets. Alternately the plug could just be constructed to break and open a circuit connected to the alarm.

Normally in accordance with the invention the conductor is imbedded in the fork. It can also be extended as a loop a full length of the handle. In this latter case when the handle has at an end opposite the fork a latch-actuating arm the loop extends into the arm.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
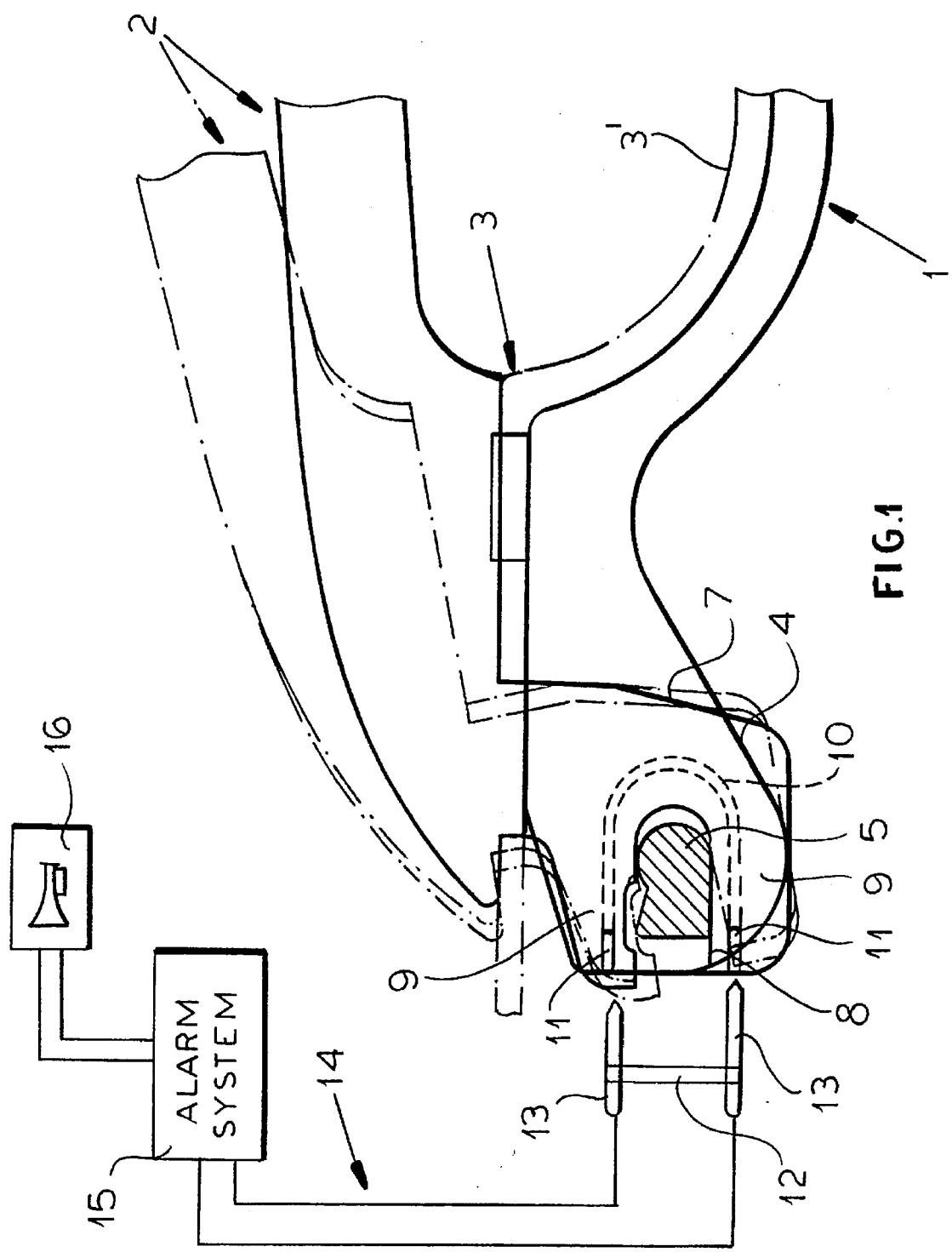
FIG. 1 is a partly diagrammatic and partly sectional view of the handle according to the invention.
Figure 2:
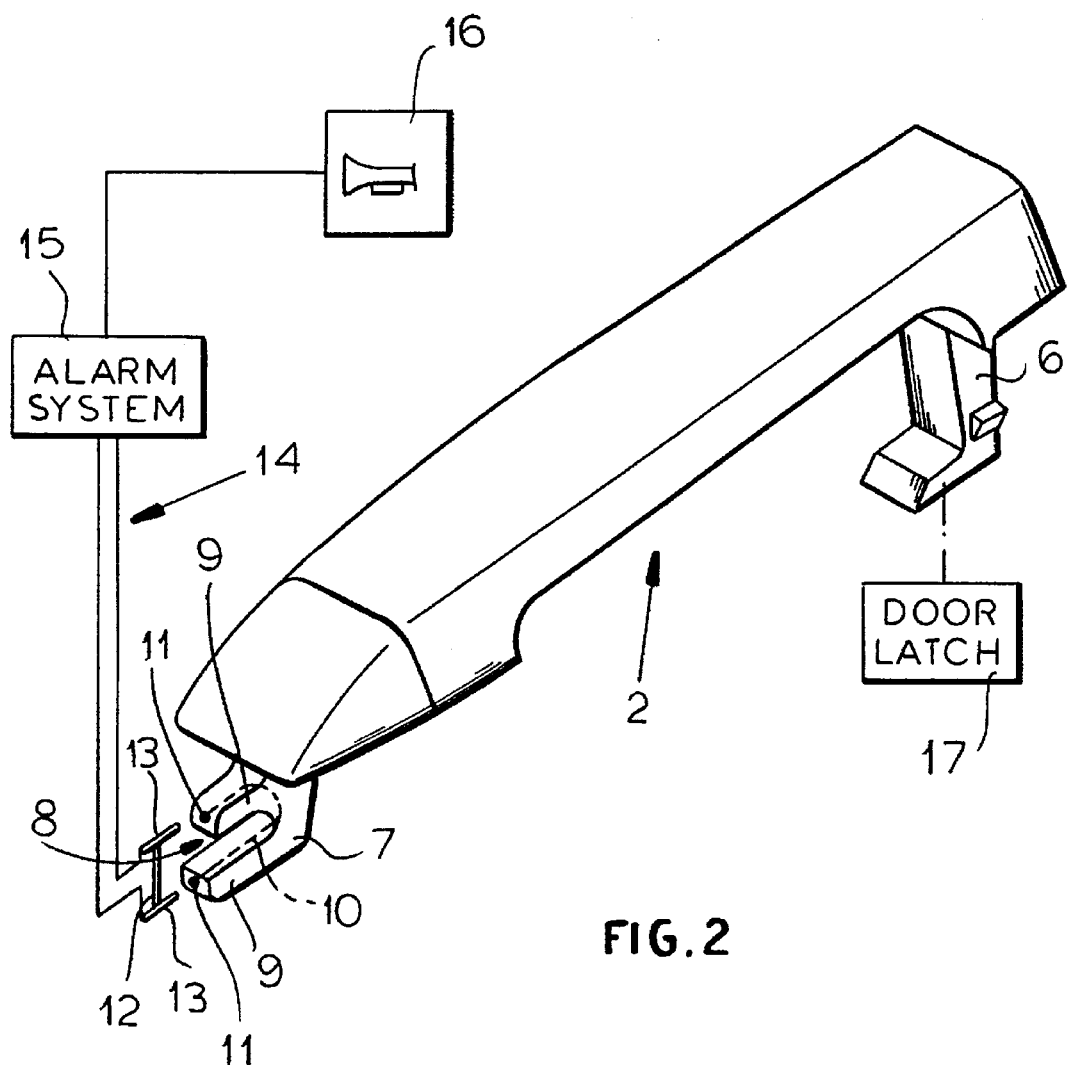
FIG. 2 is a perspective view of the system of FIG. 1 removed from the door.

As seen in FIG. 1 an actuating handle assembly for a motor-vehicle door latch has two parts, a backing plate 1 and a handle 2 both normally made of cast metal. The plate 1 lies against the inside surface of an outside door panel 3 at a hand recess 3' therein and the handle 2 lies substantially outside the panel 3 but engages through it at one end with an arm 6 (FIG. 2) that acts on the latch 17 (FIG. 2) and at the other end with a pivot fork 7.

The backing plate 1 is formed with a pair of spaced but parallel mounts 4 bridged by a pivot pin or bar 5 extending along an axis that is crosswise to a longitudinal direction of the handle 2. The fork 7 of the handle 2 is formed with a mouth or seat 8 that engages over the pivot pin 5 so that the handle 2 can pivot between the solid-line normal or rest position and the normal outer or actuated position shown in dot-dash lines in FIG. 1. Such movement normally actuates the latch 17 to open the door having the panel 3.

According to the invention the fork 7 has a pair of sides or flanks 9 each provided with a respective longitudinally open socket 11. A U-shaped electrical conductor 10, a piece of wire, is imbedded in the fork 7 and bridges the sockets 11. A plug 12 has two pin-like prongs 13 that are normally snugly engaged in the sockets 11 and that are connected via a dual-conductor wire 14 to an alarm system 15 having a siren 16 or other attention-getting device.

Thus according to the invention if the handle 2 is displaced outward past the normal outer position, at least one of the prongs 13 will pull out of the respective socket 11, thereby opening the circuit normally closed by the wire 10.

This will trip the alarm 16. A would-be thief who is prying out the door handle 2 will therefore normally be scared off before he/she has any time to actually open the vehicle door.

Figure 3:
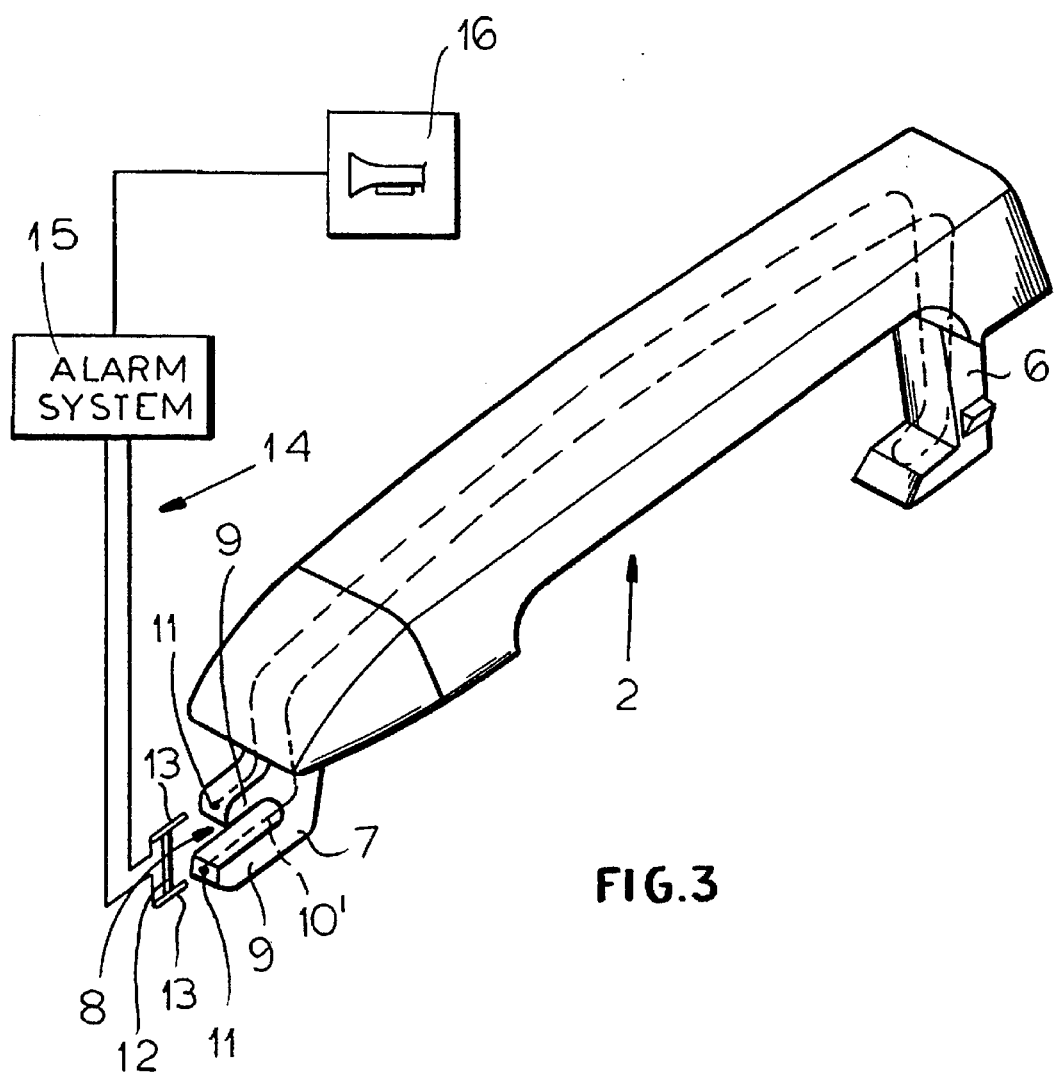
FIG. 3 is a view like FIG. 2 of a variant on the handle assembly of this invention.

In FIG. 3 a system is shown where a conductor 10' connected between the sockets 11 does not form a simple loop in the fork 7, but extends as a loop to the far end of the handle 2, to the lower end of the latch-actuating arm 6. Thus a more sophisticated thief who tries to cut through the handle 2 will also open-circuit the alarm system 15 and trip it.

I claim:

1. In motor vehicle having an alarm system, a door having a panel, and a latch, an actuating assembly comprising:

a handle extending longitudinally on an outside of the panel and having one end coupled to the latch and another end projecting through the panel and provided with a fork having a longitudinally open seat;

a backing plate on an inside of the panel and provided with a transversely extending pivot bar engaged in the seat of the fork, the handle being pivotal about the bar between a rest position relatively close to the door and an outer actuated position pulled out from the door;

an electrical conductor imbedded in the handle and having a pair of opposite ends exposed longitudinally at the fork;

respective contact elements secured to the door and releasably engaged with the conductor ends, the contact elements and opposite ends being positioned such that on movement of the handle outward beyond its outer actuated position at least one of the contacts is separated from the respective conductor end; and means including electrical circuitry between the alarm system and the contacts for activating the alarm system when one of the contacts is separated from the respective conductor end.

2. The assembly defined in claim 1 wherein the ends are formed as sockets and the contact elements are a plug fitting into the sockets.

3. The assembly defined in claim 1 wherein the conductor is imbedded in the fork.

4. The assembly defined in claim 1 wherein the conductor is extended as a loop a full length of the handle.

5. The assembly defined in claim 4 wherein the handle has at an end opposite the fork a latch-actuating arm, the loop extending into the arm.

* * * * *